No. 880,540. PATENTED MAR. 3, 1908.
J. H. KINEALY.
APPARATUS FOR SEWAGE DISPOSAL.
APPLICATION FILED SEPT. 7, 1906.

WITNESSES
INVENTOR
John H. Kinealy

UNITED STATES PATENT OFFICE.

JOHN H. KINEALY, OF FERGUSON, MISSOURI.

APPARATUS FOR SEWAGE DISPOSAL.

No. 880,540.　　Specification of Letters Patent.　　Patented March 3, 1908.

Application filed September 7, 1906. Serial No. 333,663.

*To all whom it may concern:*

Be it known that I, JOHN H. KINEALY, a citizen of the United States, residing at Ferguson, county of St. Louis, and State of Missouri, have invented a new and useful Improvement in Apparatus for Sewage Disposal, of which the following is a full, clear, and exact specification, reference being had to the accompanying drawings, which form a part thereof.

My invention relates to that type of apparatus for sewage disposal in which advantage is taken of the action of micro-organisms to break down and dispose of fecal matter by reducing it to a liquid and gas, and in which the purified liquid is drawn off and used for irrigating purposes or allowed to run to waste.

The object of my invention is to make a cheap apparatus for disposing of sewage in connection with isolated dwellings, and a further object of my invention is to provide an apparatus that can be manufactured and sold direct to users and installed by them without the use of skilled labor.

My invention is fully shown in the accompanying drawings, which show sections of apparatus as installed ready for use.

Figure 1:
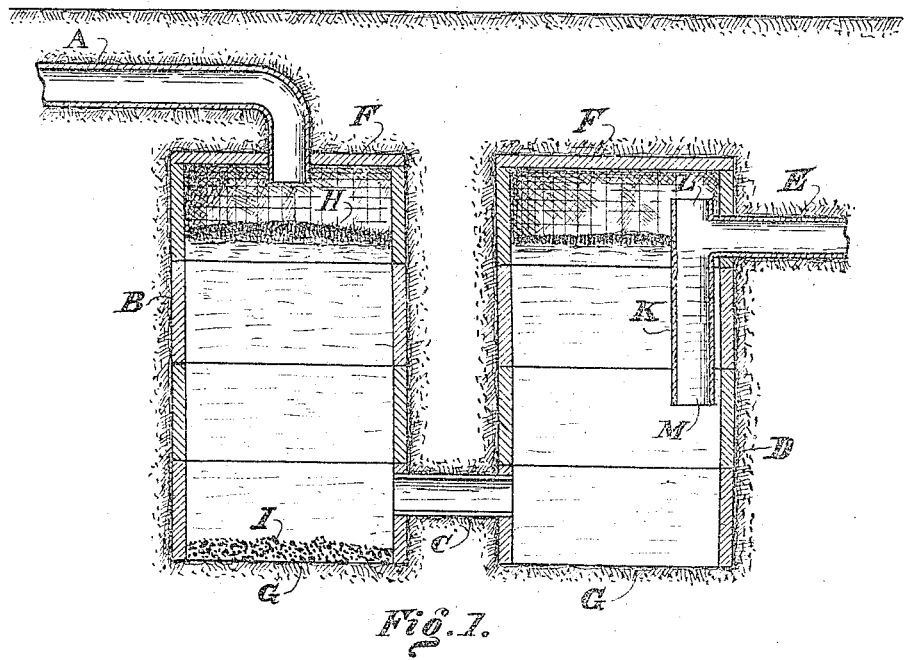
Figure 2:
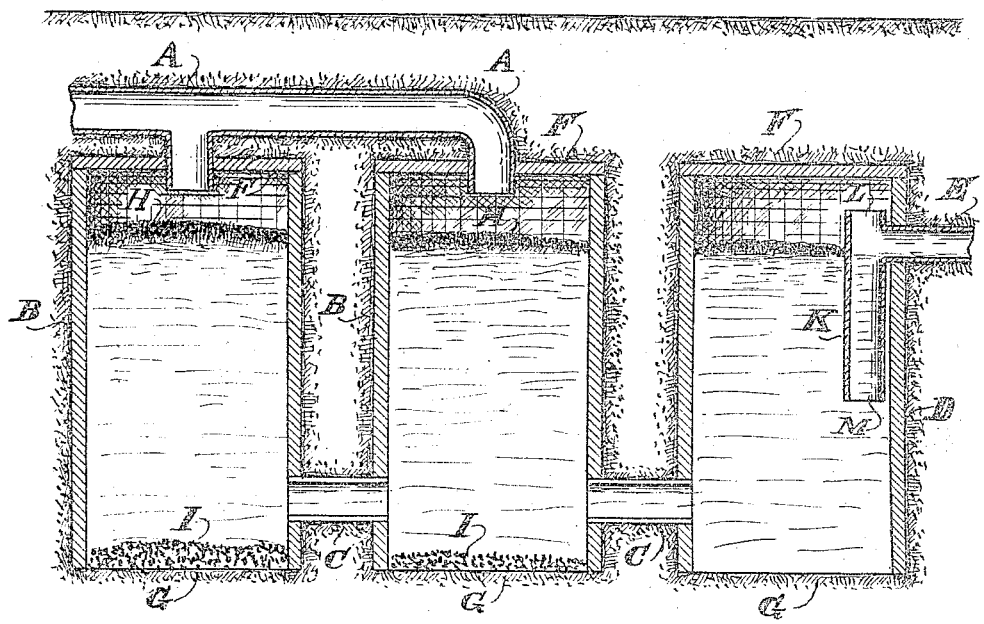

Figure 1 shows an apparatus consisting of two vessels, and Fig. 2 shows an apparatus of larger size consisting of three vessels.

In the drawings, A is an inlet connected to the pipe by which the sewage is conveyed from the house or dwelling to the apparatus; B, primary vessels of cylindrical shape; C, passages by which the vessels are connected together in series; D, a secondary vessel of cylindrical shape; E, an outlet pipe through which the surplus water and that resulting from the purification of the sewage passes away; F, the caps of the vessels; H, a scum of fecal and other light solid matter; I, a sludge composed of heavy solid matter that is difficult to destroy; G, the open lower ends of the vessels; and K an outlet piece having a vent L at the top and an open end M below where floating matter will accumulate in the vessel D.

The vessels B and D are made of any material, although it is preferable to make them of some material that will not be acted upon by the sewage, such as concrete or tile. They should be strong enough to stand handling and shipping from the place of manufacture to the point of use. The inlet and outlet pipes are ordinary sewer or drain pipes.

The operation of the apparatus is as follows: The vessels are put under the ground at such a depth that the liquid in them will not freeze, the inlet A is connected to the sewer pipe from the dwelling, and the pipe E is led to the place where it is desired to discharge the purified liquid from the sewage. The open ends G of the vessels rest directly on the earth at the bottom of the excavation in which the vessels are placed. The sewage enters through the pipe A and is discharged downward from the cap into the vessels B. The liquid accumulates in the vessels B and D, and fills them until it rises to the level of the lower part of the outlet pipe E. The lighter solid matter and especially the fecal matter carried by the sewage forms a scum H which floats on top of the liquid in the primary vessels B, and the heavier particles fall to the bottom of the vessels B and form a sludge I. There will be more fecal matter in the first of the vessels than in the second, and the scum in the first vessel will be thicker than that in the second. Since the vessels are underground where they cannot freeze and since they are covered with earth so that light and air are excluded, the scum of fecal matter H will be exposed to the action of anaërobic micro-organisms that will tend to break it down and resolve it into gases and liquids. The liquids will mix with the water of the sewage and will flow from the vessels B into the vessel D, and from there out through the pipe E. The outlet piece K is so arranged that the liquid flowing out through the pipe E is taken through the open end M at a point below where floating matter that may pass into D will accumulate, and the upper end of the outlet piece K is provided with a vent L so that the pressure in the pipe E will be the same as that in the upper part of the vessel D, thus making the liquid in the outlet piece K stand always at the same level as the liquid in the vessel D.

Any floating solid matter that may be carried from the vessels B into the vessel D will accumulate on top of the water and will be exposed in this latter to the action of the micro-organisms. Hence no solid matter will pass out through the pipe E, and the liquid that passes from E will be inoffensive. The fecal matter will form a scum H, and by discharging the new sewage on the top of this there is less danger of solid matter being carried into the secondary vessel D and thence out through the pipe E. The weight of the accumulation of solid matter on the scum H will tend to depress it, thus keeping it, the lower part especially, under water in the vessels B and in a position that is favorable to the action of the anaërobic micro-organisms.

By making each of the vessels of the inverted bucket-shape shown in the drawings and leaving the lower ends G open, part of the liquid which accumulates in the vessels tends to filter away into the surrounding earth, thus making each vessel serve partially as a filter by which a portion of the liquid matter of the sewage is disposed of.

The advantages of this apparatus lie in the fact that it can be manufactured at a manufacturing establishment and shipped to the user ready to be installed and that it can be installed by unskilled labor. The vessels may be made in sections as shown in Fig. 1, or each may be made as one complete piece as shown in Fig. 2. The apparatus is especially applicable for use in connection with isolated dwellings in suburban or country places where the sewage consists largely of water from bath tubs and kitchen sinks and carries only a comparatively small amount of fecal or other solid matter.

The size and shape of the apparatus, and the material of which it is made, may be varied to suit the requirements of different conditions, and more than three vessels may be used when it is desired to have the apparatus of large volume.

What I claim as new, and desire to secure Letters Patent for, is:

1. The combination of an apparatus for sewage disposal comprising a closed primary vessel and a closed secondary vessel, a non-siphonic passage connecting said vessels so located and arranged as to allow the flow of liquid from one to the other below where floating matter accumulates and above where non-floating matter accumulates without allowing any flow of air or gas, an inlet leading into the primary vessel, and an outlet leading from the secondary vessel, said outlet being connected to an outlet piece placed inside of the secondary vessel and having a vent at the top and arranged to take liquid from the secondary vessel at a point below where floating matter accumulates in said vessel, substantially as described.

2. The combination in an apparatus for sewage disposal comprising a closed primary vessel and a closed secondary vessel, a non-siphonic passage connecting said vessels so located and arranged as to allow the flow of liquid from one to the other below where floating matter accumulates and above where non-floating matter accumulates without allowing any flow of air or gas, an inlet leading into the primary vessel above where floating matter accumulates, and an outlet leading from the secondary vessel below the level of the inlet into the primary vessel, said outlet being connected to an outlet piece placed inside of the secondary vessel and having a vent at the top and arranged to take liquid from the secondary vessel at a point below where floating matter accumulates in said vessel, substantially as described.

3. The combination in an apparatus for sewage disposal comprising a closed primary vessel and a closed secondary vessel, an inlet leading into the primary vessel through the cap thereof, an outlet leading from the secondary vessel below the level of the inlet into the primary vessel, said outlet being connected to an outlet piece placed inside of the secondary vessel and having a vent at the top and arranged to take liquid from the secondary vessel at a point below where floating matter accumulates in said vessel, and a non-siphonic passage connecting the two vessels below the level of the outlet leading from the secondary vessel, substantially as described.

In testimony whereof I have signed my name to this specification in the presence of two subscribing witnesses.

JOHN H. KINEALY.

Witnesses:
   HARRIET M. HETFIELD,
   LILLIE MAURER.